United States Patent
Kim et al.

(10) Patent No.: US 8,917,691 B2
(45) Date of Patent: Dec. 23, 2014

(54) METHOD AND APPARATUS FOR ALLOCATING A HYBRID AUTOMATIC REPEAT REQUEST CHANNEL IDENTIFIER IN A WIRELESS ACCESS SYSTEM

(75) Inventors: Jeongki Kim, Anyang-si (KR); Seunghyun Kang, Anyang-si (KR); Youngsoo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 140 days.

(21) Appl. No.: 13/818,921

(22) PCT Filed: Sep. 8, 2011

(86) PCT No.: PCT/KR2011/006644
§ 371 (c)(1),
(2), (4) Date: Feb. 25, 2013

(87) PCT Pub. No.: WO2012/033357
PCT Pub. Date: Mar. 15, 2012

(65) Prior Publication Data
US 2013/0155993 A1  Jun. 20, 2013

Related U.S. Application Data

(60) Provisional application No. 61/381,947, filed on Sep. 11, 2010.

(30) Foreign Application Priority Data

Sep. 5, 2011 (KR) .................. 10-2011-0089833

(51) Int. Cl.
*H04W 72/04* (2009.01)
*H04L 1/18* (2006.01)
*H04L 5/00* (2006.01)

(52) U.S. Cl.
CPC ......... *H04W 72/0406* (2013.01); *H04L 1/1822* (2013.01); *H04L 1/1887* (2013.01); *H04L 1/1896* (2013.01); *H04L 5/0044* (2013.01); *H04L 5/0055* (2013.01)
USPC .......................................................... 370/329

(58) Field of Classification Search
CPC ............ H04W 72/0406; H04L 1/1812; H04L 1/1887; H04L 1/1896; H04L 1/1822
USPC .......................................................... 370/329
See application file for complete search history.

(56) References Cited

U.S. PATENT DOCUMENTS

2010/0058135 A1* 3/2010 Tseng ........................ 714/748
2010/0169733 A1* 7/2010 Kim et al. ................. 714/748
(Continued)

OTHER PUBLICATIONS

Hyunkyu Yu et al., "Proposed Text for AI_SN in Persistent Allocation (Section 16.2.14.4)", IEEE 802.16 Broadband Wireless Access Working Group, IEEE C802.16m-10/0829r1, Jul. 2010, 3 pages.

(Continued)

*Primary Examiner* — Min Jung
(74) *Attorney, Agent, or Firm* — Lee, Hong, Degerman, Kang & Waimey (57) ABSTRACT

A method for allocating a HARQ channel identifier (ACID) in a wireless access system includes receiving, from a base station, a first message which includes control information indicating an initial value of a HARQ channel identifier mapped onto a specific service flow, via a dynamic service procedure coupled to a base station; receiving a second message indicating persistent resource allocation from the base station, the second message including information regarding the initial value and number of the ACID used in the persistent resource allocation; comparing the initial value of the ACID with the control information; and allocating the value of the ACID used in the persistent resource allocation to the specific service flow when the control information included in the first message is the same as the initial value of the ACID included in the second message as a result of the comparison.

20 Claims, 5 Drawing Sheets

(56) References Cited

U.S. PATENT DOCUMENTS

| | | | |
|---|---|---|---|
| 2011/0044266 A1* | 2/2011 | Shrivastava et al. | 370/329 |
| 2012/0147734 A1* | 6/2012 | Kim et al. | 370/216 |
| 2012/0207122 A1* | 8/2012 | Kim et al. | 370/329 |
| 2014/0036843 A1* | 2/2014 | Mohanty et al. | 370/329 |

OTHER PUBLICATIONS

Sangheon Kim et al., "Modification to UL Persistent Allocation A-MAP IE (Section 16.3.6.5)", IEEE 802.16 Broadband Wireless Access Working Group, IEEE C802.16m-10/0834, Jul. 2010, 5 pages.

Kelvin Chou, "Table Reformatting and Cleanup on AAI-DSA-REQ/RSP/ACK (16.2.3.47.1)", IEEE 802.16 Broadband Wireless Access Working Group, IEEE C802.16m-10/1120, Sep. 2010, 14 pages.

Jeongki Kim et al., "Proposed Text for flow mapping for persistent scheduling (16.2.7)", IEEE 802.16 Broadband Wireless Access Working Group, C802.16m-10/1224, Sep. 2010, 4 pages.

* cited by examiner

METHOD AND APPARATUS FOR ALLOCATING A HYBRID AUTOMATIC REPEAT REQUEST CHANNEL IDENTIFIER IN A WIRELESS ACCESS SYSTEM

CROSS-REFERENCE TO RELATED APPLICATIONS

This application is the National Stage filing under 35 U.S.C. 371 of International Application No. PCT/KR2011/006644, filed on Sep. 8, 2011, which claims the benefit of earlier filing date and right of priority to Korean Patent Application No. 10-2011-0089833, filed on Sep. 5, 2011, and also claims the benefit of U.S. Provisional Application Ser. No. 61/381,947, filed on Sep. 11, 2010, the contents of which are all hereby incorporated by reference herein in their entirety.

BACKGROUND OF THE INVENTION

1. Field of the Invention

The present invention relates to a wireless access system, and more particularly, to a method and apparatus for allocating a hybrid automatic repeat request (HARQ) channel identifier (ACID).

2. Related Art

Persistent allocation (PA) is one of scheduling methods for effectively allocating resources with respect to a connection having a periodic traffic pattern and a relatively fixed payload size.

When a base station (BS) periodically allocates a resource to a user equipment (UE) having a corresponding connection at a later time except for initial allocation, the BS allocates the resource without a control signal (e.g., A-MAP). When the resource is initially allocated through persistent allocation, the UE determines that the resource is periodically allocated through initially received resource allocation information, and exchanges traffic with respect to the BS by using an allocated resource area.

At present, resources are allocated based on the UE in the 802.16m system and persistent allocation is also achieved based on not a current service flow but the UE. Therefore, the UE cannot know for which flow (or connection) the area is allocated.

Therefore, if the UE has traffic for two or more connections at a time when a resource of uplink persistent allocation is allocated without a MAP, the UE transmits the traffic by the use of an uplink (UL) scheduler designated for a corresponding area. Herein, a case may occur in which traffic for a service flow for the persistent allocation is not transmitted.

To solve this problem, in a dynamic service addition (DSA) procedure in which a specific service is generated, if the service uses persistent allocation or the service is real-time traffic to which latency is important such as a voice over internet protocol (VoIP), several HARQ channel IDs (ACIDs) are pre-allocated to the service. The pre-allocated ACID is reserved for the service until the service is deleted (i.e., dynamic service deletion (DSD) procedure). If a resource for the allocated ACID is allocated, the UE transmits a packet for a service linked to the ACID through the allocated resource by assigning a top priority to the packet.

In this case, a resource linked to an ACID allocated to a specific service flow is restricted not to be used by another service flow until a corresponding service is deleted.

SUMMARY OF THE INVENTION

In case of the aforementioned method, a hybrid automatic repeat request (HARQ) channel identifier (ACID) mapped to a service cannot be used in another service flow packet transmission for a long time until a service is deleted (i.e., until a dynamic service deletion (DSD) procedure). For example, when four ACIDs (i.e., ACID=1, 2, 3, 4) are linked to a service flow 'A', ACID=1, 2, 3, 4 cannot be used for another packet transmission even if a packet for a service is not generated.

If a packet allocation (PA) is allocated to a voice over internet protocol (VoIP) service, ACIDs 1, 2, 3, and 4 are reserved for the PA only when the PA is activated. In this case, if the ACID is mapped to a service flow which uses the PA, a UE cannot use the ACID even if the PA is deactivated.

According to a VoIP activation ratio, a ratio of activation and de-activation is about 50:50.

Therefore, there are many cases in which the UE does not use the reserved ACID. If two PAs are allocated to one UE and four ACIDs are reserved for each PA, 8 ACIDs cannot be used by the UE in a deactivated duration. This causes a problem in that uplink resources of the UE cannot be effectively used. In particular, if there are many uplink services when using a UE supporting multiple carriers, a situation may occur in which the number of available ACIDs is further deficient.

Accordingly, in order to solve the aforementioned problem, the present invention provides a method in which only an initial ACID value is mapped to a specific service flow and is then transmitted to a UE through a dynamic service procedure (i.e., DSx procedure).

In addition, the present invention also provides a method for allocating ACID values allocated through persistent resource allocation to a service flow.

In an aspect, a method for allocating a hybrid automatic repeat request (HARQ) channel identifier (ACID) in a wireless access system is provided. The method includes receiving a first message including control information indicating an initial ACID value mapped to a specific service flow from a base station via a dynamic service procedure with respect to the base station, receiving a second message indicating persistent resource allocation from the base station, wherein the second message includes information regarding an initial ACID value and the number of the ACIDs used in the persistent resource allocation, comparing the initial ACID value included in the second message with the control information included in the first message, and allocating the ACID values used in the persistent resource allocation to the specific service flow when a result of the comparison shows that the control information included in the first message is the same as the initial ACID value included in the second message.

The method may further include transmitting to the base station a packet corresponding to the specific service flow through a persistent resource allocation area included in the second message.

If a plurality of service flows is present, a packet corresponding to the specific service flow may be preferentially transmitted to the base station through the persistent resource allocation area.

The method may further include receiving a third message indicating de-allocation of the persistent resource allocation from the base station, and de-allocating the remaining ACID values other than the initial ACID value corresponding to the control information among the ACID values allocated to the specific service flow.

The specific service flow may be a service flow which is added or changed via a dynamic service addition or change procedure with respect to the base station.

The specific service flow may be a service flow which uses persistent allocation.

The first message may be a dynamic service addition request (DSA-REQ), dynamic service addition response (DSA-RSP), dynamic service change request (DSC-REQ), or dynamic service change response (DSC-RSP) message.

The second message and the third message may be persistent allocation A-MAP information elements (IEs).

In another aspect, a method for allocating a hybrid automatic repeat request (HARQ) channel identifier (ACID) in a wireless access system is provided. The method includes mapping an initial ACID value for each service flow, transmitting a first message including control information indicating an initial ACID value mapped to a specific service flow to a terminal via a dynamic service procedure with respect to the terminal, transmitting a second message indicating persistent resource allocation to the terminal, wherein the second message includes information regarding an initial ACID value and the number of the ACIDs used in the persistent resource allocation, and receiving from the terminal a packet corresponding to the specific service flow through a persistent resource allocation area included in the second message.

The specific service flow may be a service flow which is added or changed via a dynamic service addition or change procedure with respect to the terminal.

The specific service flow may be a service flow which uses persistent allocation.

The first message may be a dynamic service addition request (DSA-REQ), dynamic service addition response (DSA-RSP), dynamic service change request (DSC-REQ), or dynamic service change response (DSC-RSP) message.

The second message may be a persistent allocation A-MAP information element (IE).

In another aspect, a terminal for allocating a hybrid automatic repeat request (HARQ) channel identifier (ACID) in a wireless access system is provided. The terminal includes a radio frequency (RF) unit for transmitting and receiving a radio signal with respect to an external device, and a controller coupled to the RF unit. The controller controls the RF unit to receive a first message including control information indicating an initial ACID value mapped to a specific service flow from a base station via a dynamic service procedure with respect to the base station, and controls the RF unit to receive a second message indicating persistent resource allocation from the base station, wherein the second message includes information regarding an initial ACID value and the number of the ACIDs used in the persistent resource allocation. The controller compares the initial ACID value included in the second message with the control information included in the first message, and allocates the ACID values used in the persistent resource allocation to the specific service flow when a result of the comparison shows that the control information included in the first message is the same as the initial ACID value included in the second message.

The controller may control the RF unit to transmit to the base station a packet corresponding to the specific service flow via a persistent resource allocation area included in the second message.

The controller may control the RF unit to preferentially transmit a packet corresponding to the specific service flow to the base station through the persistent resource allocation area if a plurality of service flows is present.

The controller may control the RF unit to receive a third message indicating de-allocation of the persistent resource allocation from the base station, and to de-allocate the remaining ACID values other than the initial ACID value corresponding to the control information among the ACID values allocated to the specific service flow.

The specific service flow may be a service flow which is added or changed via a dynamic service addition or change procedure with respect to the base station.

The specific service flow may be a service flow which uses persistent allocation.

The first message may be a dynamic service addition request (DSA-REQ), dynamic service addition response (DSA-RSP), dynamic service change request (DSC-REQ), or dynamic service change response (DSC-RSP) message.

The second message and the third message may be persistent allocation A-MAP information elements (IEs).

The present invention has an advantage in that, since only an initial hybrid automatic repeat request (HARQ) channel identifier (ACID) value is mapped to a specific service flow, an uplink resource of a user equipment can be effectively used when persistent allocation is activated or de-activated.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e.

The UTRA is part of a universal mobile telecommunications system (UMTS).

3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Although a 802.16 (particularly, 16 m) system is taken as an example in the following description, the method of the present invention is not limited to the 802.16m system, and thus is apparently applied to a system such as LTE, LTE-A, etc.

Figure 1:
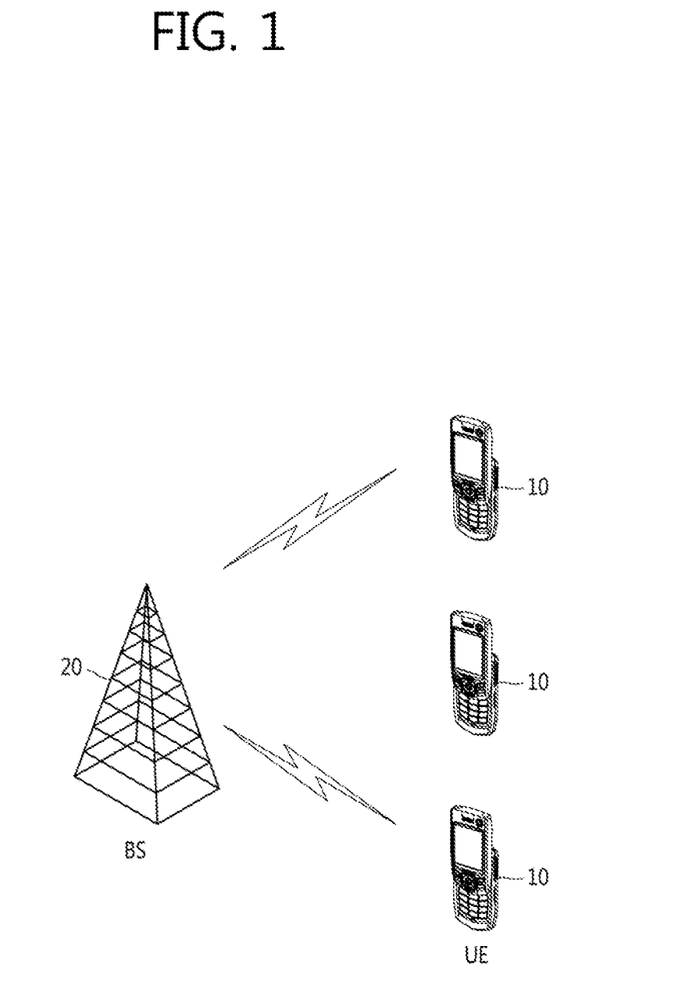
FIG. 1 shows a wireless communication system according to an exemplary embodiment of the present invention.

FIG. 1 shows a wireless communication system according to an exemplary embodiment of the present invention.

The wireless communication system can be widely deployed to provide a variety of communication services, such as voices, packet data, etc.

Referring to FIG. 1, the wireless communication system includes a mobile station (MS) 10 and a base station (BS) 20. The MS 10 may be fixed or mobile, and may be referred to as another terminology, such as a user equipment (UE), a user terminal (UT), a subscriber station (SS), a wireless device, an advanced mobile station (AMS), etc.

The BS 20 is generally a fixed station that communicates with the MS 10 and may be referred to as another terminology, such as a node-B, a base transceiver system (BTS), an access point, etc. There may be one or more cells within the coverage of the BS 20.

The wireless communication system may be a system based on orthogonal frequency division multiplexing (OFDM)/orthogonal frequency division multiple access (OFDMA).

The OFDM uses a plurality of orthogonal subcarriers. The OFDM uses an orthogonality between inverse fast Fourier transform (IFFT) and fast Fourier transform (FFT). A transmitter transmits data by performing IFFT on the data. A receiver restores original data by performing FFT on a received signal. The transmitter uses IFFT to combine the plurality of subcarriers, and the receiver uses FFT to split the plurality of subcarriers.

In addition, a slot is a minimum possible data allocation unit, and is defined with a time and a subchannel. In an uplink, a plurality of tiles may construct the subchannel. Six tiles may construct the subchannel. In the uplink, three OFDM symbols and one subchannel may construct one burst.

In case of partial usage of subchannels (PUSC) permutation, each tile may include four contiguous subcarriers on three OFDM symbols. Optionally, each tile may include three contiguous subcarriers on three OFDM symbols. A bin includes 9 contiguous subcarriers on an OFDM symbol. A band denotes a group of four rows of the bin. Six contiguous bins construct an adaptive modulation and coding (AMC) subchannel in the same band.

Figure 2:
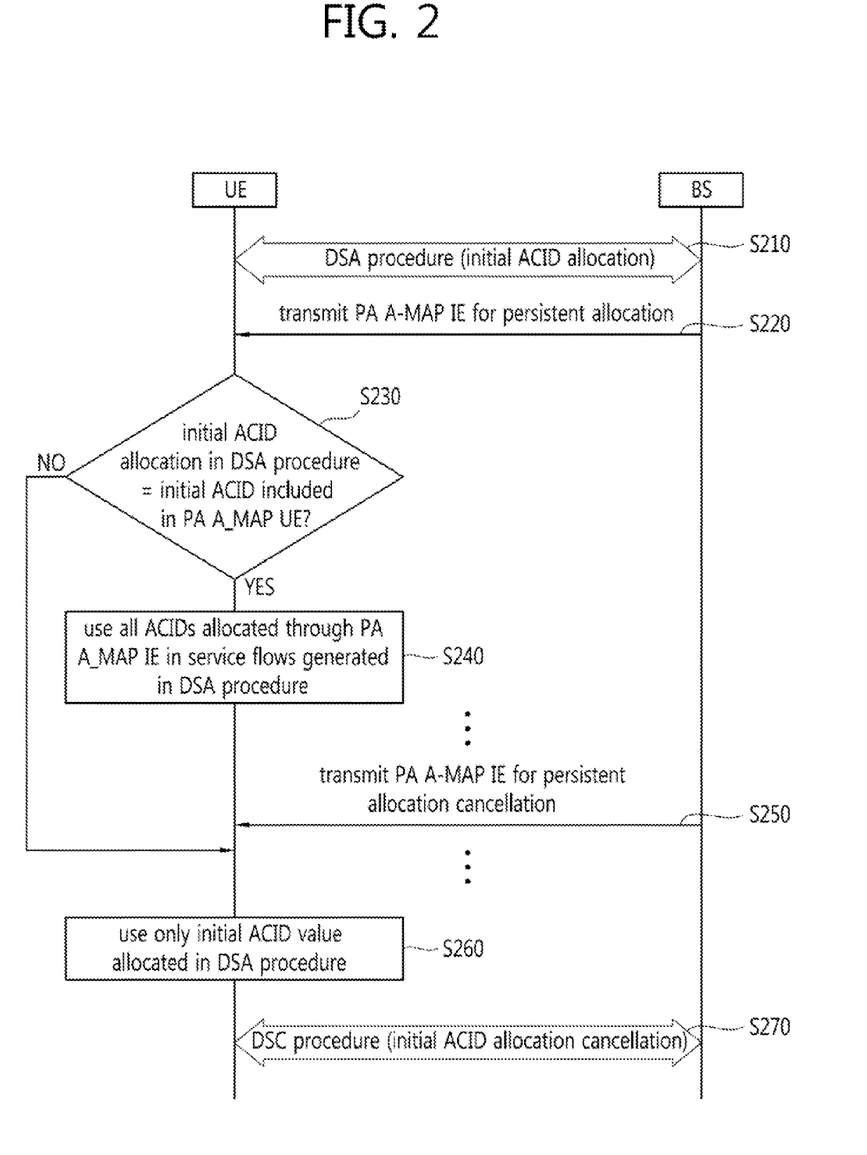
FIG. 2 is a flowchart of a method for allocating an ACID to a service flow according to an embodiment of the present invention.

FIG. 2 is a flowchart of a method for allocating an ACID to a service flow according to an embodiment of the present invention.

First, a BS maps an initial HARQ channel identifier (ACID) value used in persistent allocation with respect to a specific service flow.

Herein, the specific service flow may use persistent allocation or may represent a service flow regarding real-time traffic transmission which is sensitive to latency such as VoIP.

Thereafter, the BS performs a dynamic service addition (DSA) procedure to generate (or add) a new service flow with respect to a UE. The DSA procedure can be performed at the request of the UE or the BS.

In this case, the BS transmits control information indicating an initial ACID value mapped to a service flow newly generated through the DSA procedure (hereinafter, such a service flow is called a 'specific service flow') to the UE (step S210).

That is, the control information indicates information for indicating an index of an ACID used only to transmit data corresponding to the generated service flow.

The control information can be transmitted to the UE through a dynamic service addition request/response (DSA REQ/RSP) message.

In this case, the UE uses the initial ACID value, which is received from the BS through the DSA procedure, for a corresponding service flow until the service flow is deleted.

In addition, the control information can be transmitted to the UE not only through the DSA procedure but also through a dynamic service change (DSC) procedure.

That is, the BS allocates only an initial ACID value to a specific service flow among ACID values used for persistent allocation, so that the initial ACID value mapped to the specific service flow is used only for the service during the specific service is present and if the service flow is deleted, the initial ACID value is used for another service flow.

For another example, the UE may use the remaining ACID values, except for the initial ACID values mapped to another service flow, in a service flow in addition to the initial ACID value mapped to the specific service flow.

For another example, with respect to a service flow to which an initial ACID value is not allocated, the UE may use the remaining ACID values except for the ACID values mapped to another service flow in a service flow by using an initial ACID value.

Table 1 below shows an example of a DSA REQ/RSP message format including an initial ACID value mapped to a specific service flow through a DSA procedure according to an embodiment of the present invention.

TABLE 1

| M/O | Attributes/Array of attributes | Size(bits) | Value/Notes | Conditions |
|---|---|---|---|---|
| ... | ... | ... | ... | ... |
| O | HARQ Channel Mapping (ACID) | 5 | Indicates the index (ACID) of HARQ channel which is used only for carrying data on this service flow. | |
| ... | ... | ... | ... | ... |

Thereafter, for persistent resource allocation, the BS transmits a persistent allocation (PA) A-MAP information element (IE) to the UE (step S220).

Thereafter, the UE compares the initial ACID value mapped to the specific service flow with the initial ACID value included in the PA A-MAP IE (step S230). That is, through the comparison, the UE determines whether to allocate all ACID values allocated using the PA A-MAP IE to the specific service flow.

If the UE determines that the initial ACID value mapped to the specific service flow is equal to the initial ACID value included in the PA A-MAP IE according to the comparison result, all of the ACID values allocated using the PA A-MAP IE are used for the specific service flow (step S240).

In addition, if the UE determines that the initial ACID value mapped to the specific service flow differs from the initial ACID value included in the PA A-MAP IE according to the comparison result, only the initial ACID value mapped to the specific service flow is used for the specific service flow.

That is, if a PA for the newly generated service flow is activated, the UE allows all ACID values allocated to the PA including the initial ACID value to be used for a corresponding service.

Thereafter, if the PA for the specific service flow is de-activated or de-allocated, that is, if a PA A-MAP IE indicating de-allocation of the PA is received from the BS (step S250), the UE can use the remaining ACID values, except for the initial ACID value mapped to the specific service flow, for another service flow until the PA is re-activated (step S270).

Thereafter, if the specific service flow is deleted through a DSD procedure between the UE and the BS, the initial ACID value allocated to the specific service flow is de-allocated and thus can be used for another service flow (step S270).

Thereafter, the UE transmits a packet corresponding to the specific service flow through a persistent resource allocation area received through the PA A-MAP IE. Herein, if a packet for a plurality of service flows is present, the UE preferentially transmits the packet corresponding to the specific service flow through the persistent resource allocation area.

Figure 3:
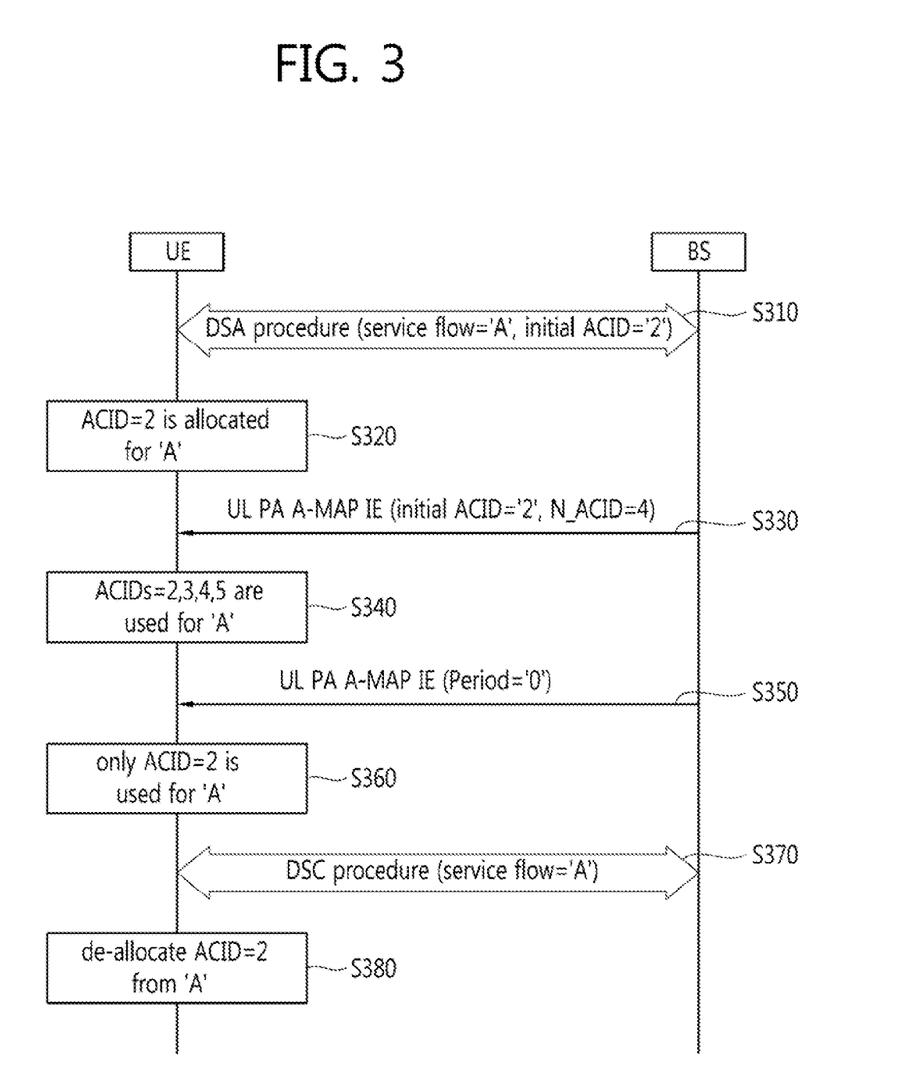
FIG. 3 is a flowchart of a method for allocating an ACID to a service flow according to an embodiment of the present invention.

FIG. 3 is a flowchart of a method for allocating an ACID to a service flow according to an embodiment of the present invention.

As shown in FIG. 3, a service flow 'B' is generated through a DSA procedure between a BS and a UE, and the BS maps an initial ACID value '2' to the service flow 'B' and transmits it to the UE when performing the DSA procedure (step S310).

Herein, it is assumed that the service flow 'B' is a service flow which uses persistent allocation.

The UE uses the initial ACID value '2' for the service flow 'B' until the service flow 'B' is deleted in a DSD procedure (step S320).

For example, if there is resource allocation which uses the ACID value '2', the UE transmits a packet for the service flow 'B' to the BS by using an allocated resource. In this case, if there is no packet for the service flow 'B' and only a packet for another service flow 'C' exists, the UE may transmit the packet for the service flow 'C' by using a resource for the ACID value '2'. In this case, it is determined by a scheduler of the BS.

Thereafter, in a case in which a PA is activated for the service flow 'B' at a specific time, that is, the UE receives a PA A-MAP IE for indicating PA from the BS (step S330), if an initial ACID is set to 2 in the received PA A-MAP IE and N_ACID, i.e., the number of ACIDs used for PA, is set to 4, then the UE determines that ACIDs 2, 3, 4, and 5 are used for the PA.

In addition, in this case, the UE confirms the initial ACID value '2' included in the PA A-MAP IE and then can determine that the PA is mapped to the service flow 'B'.

Therefore, the UE determines that ACID values corresponding to the remaining values 3, 4, and 5 are used for the service flow 'B' in addition to an initial ACID value '2' during the PA is activated, that is, until the PA is de-allocated, and uses ACIDs 2 to 5 for the service flow 'B' (step S340).

Thereafter, if the PA is de-allocated or de-activated, that is, if a PA A-MAP IE indicating de-allocation of the PA is received from the BS (step S350), the UE uses the remaining ACID values 3, 4, and 5, except for the initial ACID value '2', for another service flow (step S360).

Thereafter, if the service flow 'B' is deleted in a DSD procedure, the UE de-allocates the initial ACID value '2' mapped to the service flow 'B' (steps S370 and S380). That is, the UE can use the initial ACID value '2' for another service flow.

Figure 4:
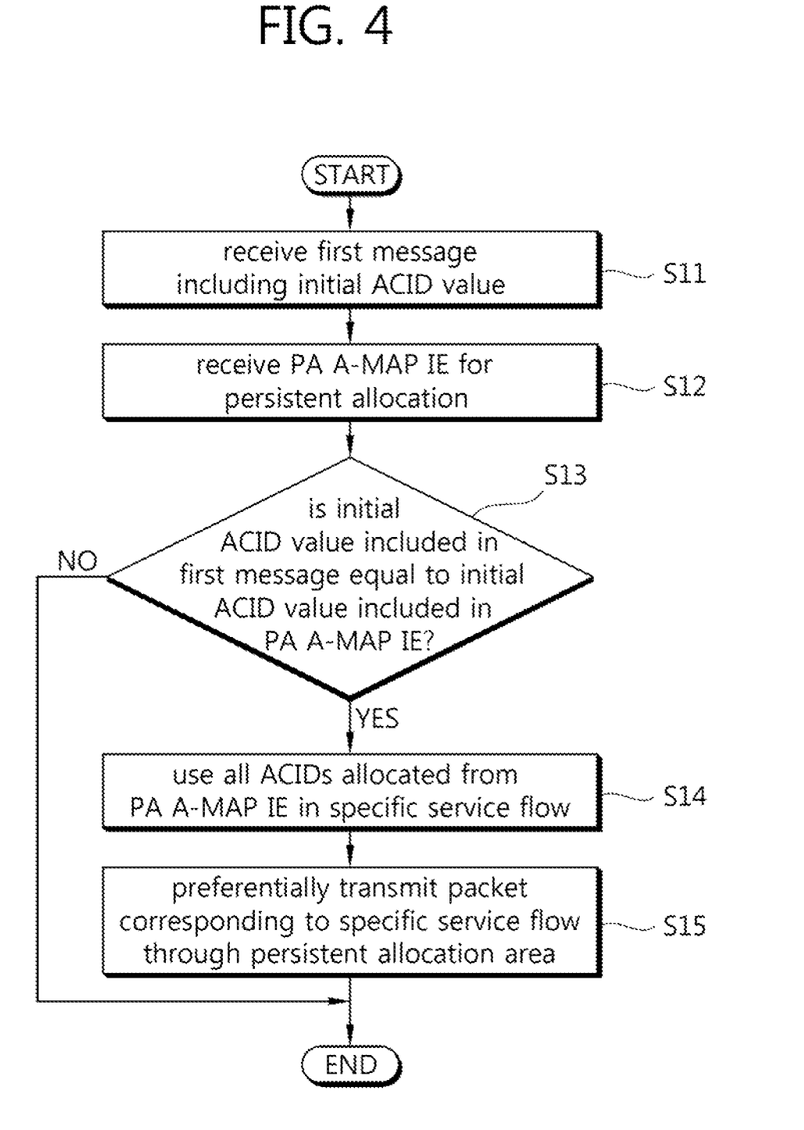
FIG. 4 is a flowchart of a method for operating a UE for allocating an ACID to a service flow according to an embodiment of the present invention.

FIG. 4 is a flowchart of a method for operating a UE for allocating an ACID to a service flow according to an embodiment of the present invention.

Referring to FIG. 4, the UE receives a first message including control information indicating an initial ACID value mapped to a specific service flow from a BS through a DSA procedure between the BS and the UE (step S11).

Herein, a dynamic service procedure (DSx) refers to a DSA procedure in which a new service flow (connection) is generated (or added) or a DSC procedure in which a service flow currently in use is changed. That is, the specific service flow implies a newly generated (or added) service flow or a changed service flow.

In addition, the specific service flow may be a service which uses persistent allocation or a service corresponding to real-time traffic which is sensitive to latency such as VoIP.

Herein, the first message may be a DSA-REQ message, a DSA-RSP message, a DSC-REQ message, or a DSC-RSP message.

Thereafter, the UE receives a second message for persistent resource allocation from the BS (step S12). That is, if the second message indicating the persistent resource allocation is received from the BS, the UE activates persistent allocation.

Herein, the second message refers to a persistent allocation A-MAP IE, and includes an initial ACID value used in the persistent resource allocation, ACID count information, etc.

Thereafter, the UE compares control information included in the first message, that is, an initial ACID value mapped to a specific service flow, with an initial ACID value included in the second message (step S13). Herein, the UE can confirm whether the specific service flow is a service flow used for persistent allocation through the aforementioned comparison.

Thereafter, if the comparison result shows that the control information included in the first message is equal to the initial ACID value included in the second message, the UE allocates all of ACID values (allocated through the second message) used for the persistent resource allocation to the specific service flow (step S14).

Thereafter, the UE transmits a data packet corresponding to the specific service flow to the BS through a persistent resource allocation area (step S15). In this case, if there is a plurality of service flows, the UE can preferentially transmit a data packet corresponding to the specific service flow to the BS.

That is, by comparing an initial ACID value received through a DSA or DSD procedure and an initial ACID value received through persistent resource allocation, the UE uses all ACID values used for persistent resource allocation from the BS for a service flow generated or changed through the DSA or DSC procedure, and transmits a packet corresponding to the generated or changed service through a persistent resource allocation area to the BS by prioritizing the generated or changed service flow (in case of a VoIP service or a service which uses persistent allocation).

Figure 5:
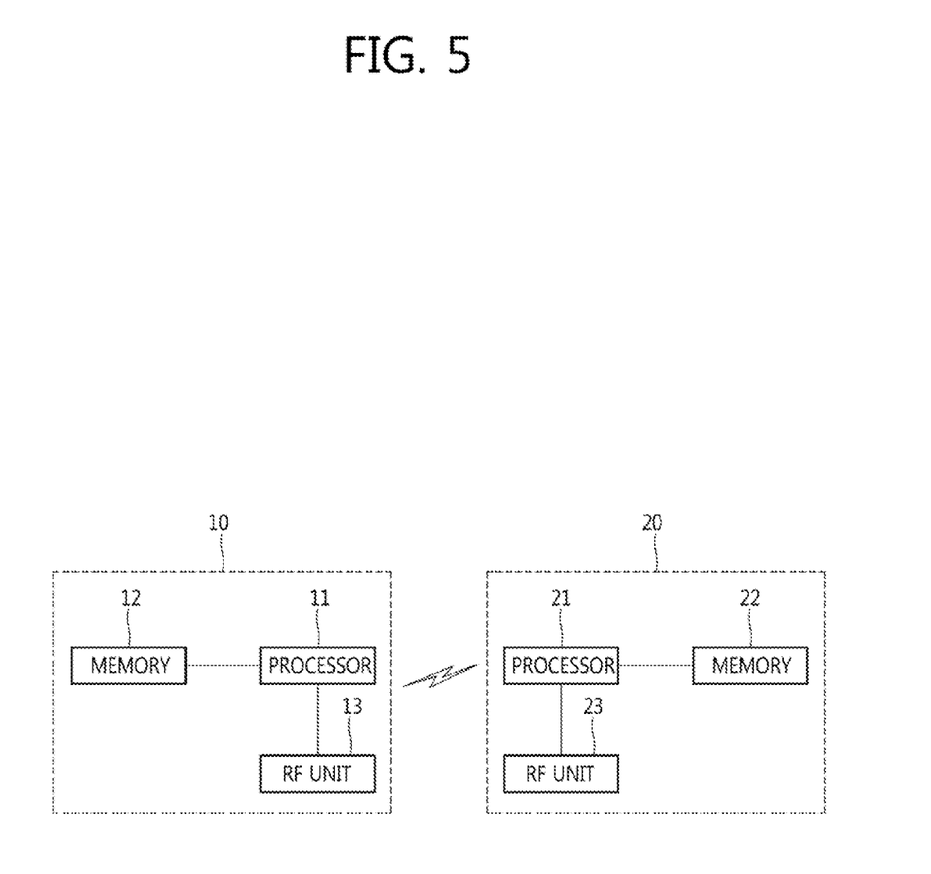
FIG. 5 is a block diagram showing internal structures of an MS and a BS in a wireless access system according to an embodiment of the present invention.

FIG. 5 is a block diagram showing internal structures of an MS and a BS in a wireless access system according to an embodiment of the present invention.

An MS 10 includes a controller 11, a memory 12, and a radio frequency (RF) unit 13.

Further, the MS also includes a display unit, a user interface unit, etc.

The controller 11 implements the proposed functions, procedures, and/or methods. Layers of a wireless interface protocol may be implemented by the controller 11.

The memory 12 is coupled to the controller 11, and stores a protocol or parameter for performing wireless communication. That is, the memory 12 stores an operating system of the MS, an application, and a general file.

The RF unit 13 is coupled to the controller 11, and transmits and/or receives an RF signal.

In addition, the display unit displays a variety of information of the MS, and may be a well-known element such as liquid crystal display (LCD), organic light emitting diodes (OLED), etc. The user interface unit may be constructed by combining well-known user interfaces such as a keypad, a touch screen, etc.

A BS 20 includes a controller 21, a memory 22, and an RF unit 23.

The controller 21 implements the proposed functions, procedures, and/or methods. Layers of a wireless interface protocol may be implemented by the controller 21.

The memory 22 is coupled to the controller 21, and stores a protocol or parameter for performing wireless communication.

The RF unit 23 is coupled to the controller 21, and transmits and/or receives an RF signal.

The controllers 11 and 21 may include an application-specific integrated circuit (ASIC), a separate chipset, a logic circuit, and/or a data processing unit. The memories 12 and 22 may include a read-only memory (ROM), a random access memory (RAM), a flash memory, a memory card, a storage medium, and/or other equivalent storage devices. The RF units 13 and 23 may include a baseband circuit for processing an RF signal. When the embodiment of the present invention is implemented in software, the aforementioned methods can be implemented with a module (i.e., process, function, etc.) for performing the aforementioned functions. The module may be stored in the memories 12 and 22 and may be performed by the controllers 11 and 21.

The memories 12 and 22 may be located inside or outside the controllers 11 and 21, and may be coupled to the controllers 11 and 21 by using various well-known means.

In addition, the terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms are intended to include the plural forms as well, unless the context clearly indicates otherwise. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

It will be understood that although the terms "first" and "second" are used herein to describe various elements, these elements should not be limited by these terms. These terms are only used to distinguish one element from another element. For example, a first component may be termed a second component, and similarly, a second component may be termed a first component without departing from the scope of the present invention.

When a component is mentioned as being "connected" to or "accessing" another component, this may mean that it is directly connected to or accessing the other component, but it is to be understood that there are no intervening components present. On the other hand, when a component is mentioned as being "directly connected" to or "directly accessing" another component, it is to be understood that there are no intervening components present.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparently understandable that claims failing to be explicitly cited in the appended claims are combined to construct new embodiments or can be included as new claims by amendment after filing the application.

What is claimed is:

1. A method for allocating a hybrid automatic repeat request (HARQ) channel identifier (ACID) in a wireless access system, the method comprising:
   receiving a first message including control information indicating an initial ACID value mapped to a specific service flow from a base station via a dynamic service procedure with respect to the base station;
   receiving a second message indicating persistent resource allocation from the base station, wherein the second message includes information regarding an initial ACID value and the number of the ACIDs used in the persistent resource allocation;
   comparing the initial ACID value included in the second message with the control information included in the first message; and
   allocating the ACID values used in the persistent resource allocation to the specific service flow when a result of the comparison shows that the control information included in the first message is the same as the initial ACID value included in the second message.

2. The method of claim 1, further comprising transmitting to the base station a packet corresponding to the specific service flow through a persistent resource allocation area included in the second message.

3. The method of claim 2, wherein if a plurality of service flows is present, a packet corresponding to the specific service flow is preferentially transmitted to the base station through the persistent resource allocation area.

4. The method of claim 1, further comprising:
   receiving a third message indicating de-allocation of the persistent resource allocation from the base station; and
   de-allocating the remaining ACID values other than the initial ACID value corresponding to the control information among the ACID values allocated to the specific service flow.

5. The method of claim 1, wherein the specific service flow is a service flow which is added or changed via a dynamic service addition or change procedure with respect to the base station.

6. The method of claim 1, wherein the specific service flow is a service flow which uses persistent allocation.

7. The method of claim 1, wherein the first message is a dynamic service addition request (DSA-REQ), dynamic service addition response (DSA-RSP), dynamic service change request (DSC-REQ), or dynamic service change response (DSC-RSP) message.

8. The method of claim 1, wherein the second message and the third message are persistent allocation A-MAP information elements (IEs).

9. A method for allocating a hybrid automatic repeat request (HARQ) channel identifier (ACID) in a wireless access system, the method comprising:

mapping an initial ACID value for each service flow;

transmitting a first message including control information indicating an initial ACID value mapped to a specific service flow to a terminal via a dynamic service procedure with respect to the terminal;

transmitting a second message indicating persistent resource allocation to the terminal, wherein the second message includes information regarding an initial ACID value and the number of the ACIDs used in the persistent resource allocation; and receiving from the terminal a packet corresponding to the specific service flow through a persistent resource allocation area included in the second message.

10. The method of claim 9, wherein the specific service flow is a service flow which is added or changed via a dynamic service addition or change procedure with respect to the terminal.

11. The method of claim 9, wherein the specific service flow is a service flow which uses persistent allocation.

12. The method of claim 9, wherein the first message is a dynamic service addition request (DSA-REQ), dynamic service addition response (DSA-RSP), dynamic service change request (DSC-REQ), or dynamic service change response (DSC-RSP) message.

13. The method of claim 9, wherein the second message is a persistent allocation A-MAP information element (IE).

14. A terminal for allocating a hybrid automatic repeat request (HARQ) channel identifier (ACID) in a wireless access system, the terminal comprising:

a radio frequency (RF) unit for transmitting and receiving a radio signal with respect to an external device; and a controller coupled to the RF unit, wherein the controller controls the RF unit to receive a first message including control information indicating an initial ACID value mapped to a specific service flow from a base station via a dynamic service procedure with respect to the base station, and controls the RF unit to receive a second message indicating persistent resource allocation from the base station, wherein the second message includes information regarding an initial ACID value and the number of the ACIDs used in the persistent resource allocation, and wherein the controller compares the initial ACID value included in the second message with the control information included in the first message, and allocates the ACID values used in the persistent resource allocation to the specific service flow when a result of the comparison shows that the control information included in the first message is the same as the initial ACID value included in the second message.

15. The terminal of claim 14, wherein the controller controls the RF unit to transmit to the base station a packet corresponding to the specific service flow via a persistent resource allocation area included in the second message.

16. The terminal of claim 14, wherein the controller controls the RF unit to preferentially transmit a packet corresponding to the specific service flow to the base station through the persistent resource allocation area if a plurality of service flows is present.

17. The terminal of claim 14, wherein the controller controls the RF unit to receive a third message indicating de-allocation of the persistent resource allocation from the base station, and to de-allocate the remaining ACID values other than the initial ACID value corresponding to the control information among the ACID values allocated to the specific service flow.

18. The terminal of claim 14, wherein the specific service flow is a service flow which is added or changed via a dynamic service addition or change procedure with respect to the base station.

19. The terminal of claim 14, wherein the specific service flow is a service flow which uses persistent allocation.

20. The terminal of claim 14, wherein the first message is a dynamic service addition request (DSA-REQ), dynamic service addition response (DSA-RSP), dynamic service change request (DSC-REQ), or dynamic service change response (DSC-RSP) message.

* * * * *